United States Patent [19]
Wessels et al.

[11] Patent Number: 6,122,429
[45] Date of Patent: *Sep. 19, 2000

[54] RARE EARTH DOPED BARIUM TITANATE THIN FILM OPTICAL WORKING MEDIUM FOR OPTICAL DEVICES

[75] Inventors: Bruce W. Wessels, Wlmette; Bruce A. Block, Chicago, both of Ill.

[73] Assignee: Northwestern University, Evanston, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/398,419

[22] Filed: Mar. 2, 1995

[51] Int. Cl.$^7$ ........................................... G02B 6/10
[52] U.S. Cl. .......................... 385/130; 385/147; 369/107
[58] Field of Search ................. 369/107, 44, 37, 369/109, 124, 275.1, 275.4; 385/130, 147

[56] References Cited

U.S. PATENT DOCUMENTS 5,471,455 11/1995 Jabr ......................................... 369/107

OTHER PUBLICATIONS

Rare–Earthed Doped Optical Fibers For Temperature Sensing; J. Lightwave Tech., vol. 10, No. 6, Jun., 1992, pp. 847–851, D. Quoi, et al.

Local–and Distant–Charge Compensation of $Eu^{3+}$ Ions in Defect Centers of $SrTiO^3$; Physical Review, vol. 45, No. 17, May 1, 1992, pp. 9642–9655, N. J. Cockroft, et al.

Variation of Viscosity of Coiling Polymers With Shear Rate; J. Chemical Physics, vol. 24, No. 4, Apr. 1956, F. Bueche, et al.

Site–Selective Spectroscopy of Erbium–Doped $SrTiO^3$, $Sr_2TiO^4$, and $Sr_3Ti_2O_7$, Physical Review, vol. 51, No. 9, Mar. 1, 1995, pp. 5649–5658, L. J. Knott, et al.

Time Decay Study of The $Er^{3+}$ Related Luminescence in $In_{1-x}Ga_xP$; Mat. Sci. Forum, vol. 143–147 (1994), pp. 743–748;Ostapenko, et al.

Rare Earth Doped Fiberglass and Amplifier; Rare Earth Doped Glasses: Optical Properties, W. J. Miniscalco, ed. by MJ. F. Digonnet, one page.

Determination of the Low–Frequency Linear Electro–Optic Effect in Tetragonal $BaTio_3$; J. of the Optical Soc. of America, vol. 55, No. 7, Jul., 1965, pp. 828–834; Johnson, et al.

Oscillator Strengths, Quantum Efficiencies, and Laser Cross Sections of $Yb^{3+}$ and $Er^{3+}$ in III–V Compounds; J. Appl. Phys. 66(8), Oct. 15, 1989, pp. 3952–3955; Auzel et al.

Epitaxial Growth of $BaTio_3$ Thin Films By Organometallic Chemical Vapor Deposition; Appl. Phys. Lett. 60(1), Jan. 6, 1992, pp. 41–43; Wills, et al.

Growth Studies of Ferroelectric Oxide Layers Prepared by Organmetallic Chemical Vapor Disposition; J. Crystal Growth 107 (1991), pp. 712–715, Willis, et al.

Second–Harmonic Generation of Poled $BaTio_3$ Thin Films; Appl. Phys, Lett. 62 (12), Mar. 22, 1993, pp. 1314–1316, H. A. Lu, et al.

Electronic Beam Induced Poiling of $BaTiO^3$ Thin Films; Appl. Phys. Lett. 63 (7), Aug. 16, 1993, pp. 874–876, H. A. Lu, et al.

Electronic Beam Induced Poiling of $BaTiO^3$Thin Films; Appl. Phys. Lett. 63 (70, Aug. 16, 1993, pp. 874–876, H. A. Lu, et al.

(List continued on next page.)

*Primary Examiner*—Akm E. Ullah

[57] ABSTRACT

Optical waveguides exhibiting non-linear and/or electro-optic properties comprise a rare earth doped barium titanate thin film as an optical working medium. The thin film is metalorganic chemical vapor deposited on a substrate in a reactor to incorporate rare earth atoms in-situ in the barium titanate or other ferroelectric oxide host material.

6 Claims, 8 Drawing Sheets

OTHER PUBLICATIONS

Nd:MgO;LiNbO$_3$ Spectroscopy and Laser Devices; J. Opt. Soc. Am. B/vol. 3, No. 1, Jan. 1986, pp. 140–146, T. Y. Fan, et al.

Er–DIFFUSD Ti:LiNbO$_3$ Waveguide Laser of 1563 and 1576 nm Emission Wavelengths; Appl. Phys. Lett. 61 (11), Sep. 14, 1992, P. Becker, et al.

Method for the Local Incorporation of Er Into LiNbO$_3$ Guided Wave Optic Devices by Ti Co–Diffusion; Appl. Phys. Lett. 60 (9), Mar. 2, 1992, G. M. Gill et al.

Structural, Magnetic, and Transport Properties of R$_x$Ba$_{1-x}$TiO$_{3-\delta}$ Solid Solutions, Where R=La, Nd, Gd, Er, and Y: Rare–Earth–Dependent Metal–To–Semiconductor Transitions; Chem. Mater, 1992 4, pp. 1038–1046; Cahit Eylem, et al.

Photoluminescence Decay of 1.54 $\mu$m Er$^{3+}$ Emission in Si and III–V Semiconductors; Electronics Letters, vol. 24, No. 24, Nov. 24, 1988.

Photoluminescence Characterization of Er–Implanted Al$_2$O$_3$ Films; Appl. Phys. Lett. 62 (24), Jun. 14, 1993, G.N. van den Hoven.

The Influence of Ionic Radii on the Incorporation of Trivalent Dopants into BaTio$_3$; M. Sci. Eng. B1 (1988) 193–201; Xue et al.

ER$^{3+}$ Doping of CaF$_2$ Layers Grown by Molecuar Beam Epitaxy; Appl. Phys. Lett. 62 (21), May 24, 1993, pp. 2616–2618, E. Daran, et al.

Rendering Barium Titanate Semiconductive by Doping with Rare–Earth Elements; pp. 187–191, N. V. Dergunova, et al.

RARE EARTH DOPED BARIUM TITANATE THIN FILM OPTICAL WORKING MEDIUM FOR OPTICAL DEVICES

This invention was made with Government support under grant Number: DMR-9120521 awarded by the National Science Foundation. The Government may have certain rights in the invention.

FIELD OF THE INVENTION

The present invention relates to a rare earth doped barium titanate optical medium for optical waveguides, optical amplifiers, electro-optic modulator devices, and other devices using active or passive optical working medium.

BACKGROUND OF THE INVENTION

There has been considerable recent interest in the fabrication of rare earth doped thin films for optically active waveguides for integrated optics applications. Since rare earth ions exhibit a characteristic intra4f shell luminescence emission that is both nearly host and temperature independent, rare earth doped ferroelectric oxides have been of particular interest as offering the possibility of simple optical devices that take advantage of the electro-optical and nonlinear optical (NLO) properties of ferroelectric oxides as well as the optical gain of the rare earth ions.

Optical devices, such as self-frequency-doubled, self-Q-switched, and self-modulated lasers in addition to amplified integrated optical circuits with no insertion losses are possible using rare earth doped ferroelectric oxides. Erbium-doped ferroelectric oxides are of special interest as optically active components due the characteristic $Er^{3+}$ emission at 1.54 microns, which corresponds to the minimum loss in silica based optical fibers. For example, planar waveguides and devices, including self-frequency doubled devices and lasers operating at near 1.54 microns have been fabricated from rare earth doped lithium niobate ($LiNbO_3$) bulk single crystals. Lithium niobate, however, exhibits several inherent limitations. First, the solubility of erbium ions (Er+) in the lithium niobate host material appears to be relatively low. Second, photo-refractive optical damage of the lithium niobate host can limit the efficiency and usefulness of lithium niobate based waveguides and optical devices. While doping the lithium niobate host with MgO is known to reduce the photorefractive damage problem for other applications, the presence of a rare earth dopant in the lithium niobate host may reduce the beneficial effect achieveable by the MgO dopant. Third, optical waveguides comprising erbium doped lithium niobate can only be made from bulk single crystal material, which is itself difficult to make, and requires a slow, costly diffusion or ion implanation treatment to render it waveguiding and also to include the erbium dopant therein.

An object of the present invention is to provide a thin film optical working medium that provides one or more of the non-linear, electro-optic and other properties associated with certain ferroelectric oxides and that includes a rare earth dopant incorporated in-situ in the host ferroelectric oxide.

Another object of the present invention is to provide an optical device that comprises an optically active or passive rare earth doped barium titanate thin film optical component that overcomes the disadvantages of the aforementioned bulk erbium doped lithium niobate optical component.

Still another object of the present invention is to provide a method of in-situ doping of a ferroelectric oxide thin film, such as barium titanate, with rare earth as the film is deposited by metalorganic chemical vapor deposition on a substrate.

SUMMARY OF THE INVENTION

The present invention provides an optical medium, and optical device including same, comprising a rare earth doped barium titanate thin film on a substrate as an optical working medium. The rare earth dopant is incorporated in the barium titanate thin film host as it is being deposited on the substrate by metalorganic chemical vapor deposition in one method embodiment of the invention.

Particular embodiments of the present invention provide an optical waveguide, optical amplifier, electro-optic modulator device, laser and other optical devices for use in integrated optics comprising a rare earth doped barium titanate thin film on a substrate as an active or passive optical working medium.

The present invention also provides a method of doping a ferroelectric oxide wherein a ferroelectric oxide film is deposited on a substrate in a reactor by metalorganic chemical vapor deposition under conditions that the ferroelectric film is doped with rare earth as it is deposited. For example, a barium-bearing reactant, titanium bearing reactant, rare earth-bearing reactant, and oxygen reactant are provided in proper proportions in the reactor and reacted under temperature and pressure conditions to deposit on the substrate a barium titanate film including rare earth dopant in-situ therein.

The above and other objects and advantages of the present invention will become more readily apparent from the following detailed description taken with the following drawings.

DESCRIPTION OF THE INVENTION

The following detailed description of the invention is offer purposes of illustrating the present invention in greater detail and not limiting the scope of the invention.

A rare earth doped barium titanate ($BaTiO_3$) thin film optical medium was grown or deposited by metaloraganic chemical vapor deposition on a substrate. In particular, reactants (i.e. metalorganic precursors) bearing the film components (e.g. barium, titanuim, rare earth, and oxygen) are provided in a reactor and reacted in proportions and under conditions of temperature and pressure controlled to deposit a barium titanate thin film that is doped in-situ with the rare earth as the film is grown or deposited on the substrate. Typically, the rare earth dopant is included in an amount of at least about 0.01 atomic percent in the thin barium titanate film, although the invention is not to be so limited. Metalorganic chemical vapor deposition appara cribed by L. A. Wills et al. in *J. Cryst. Growth*, 107, 712 (1991), the teachings of which are incorporated herein by reference, can be used in the practice of the present invention to deposit the rare earth doped barium titanate thin film optical medium on a suitable substrate.

Figure 9:
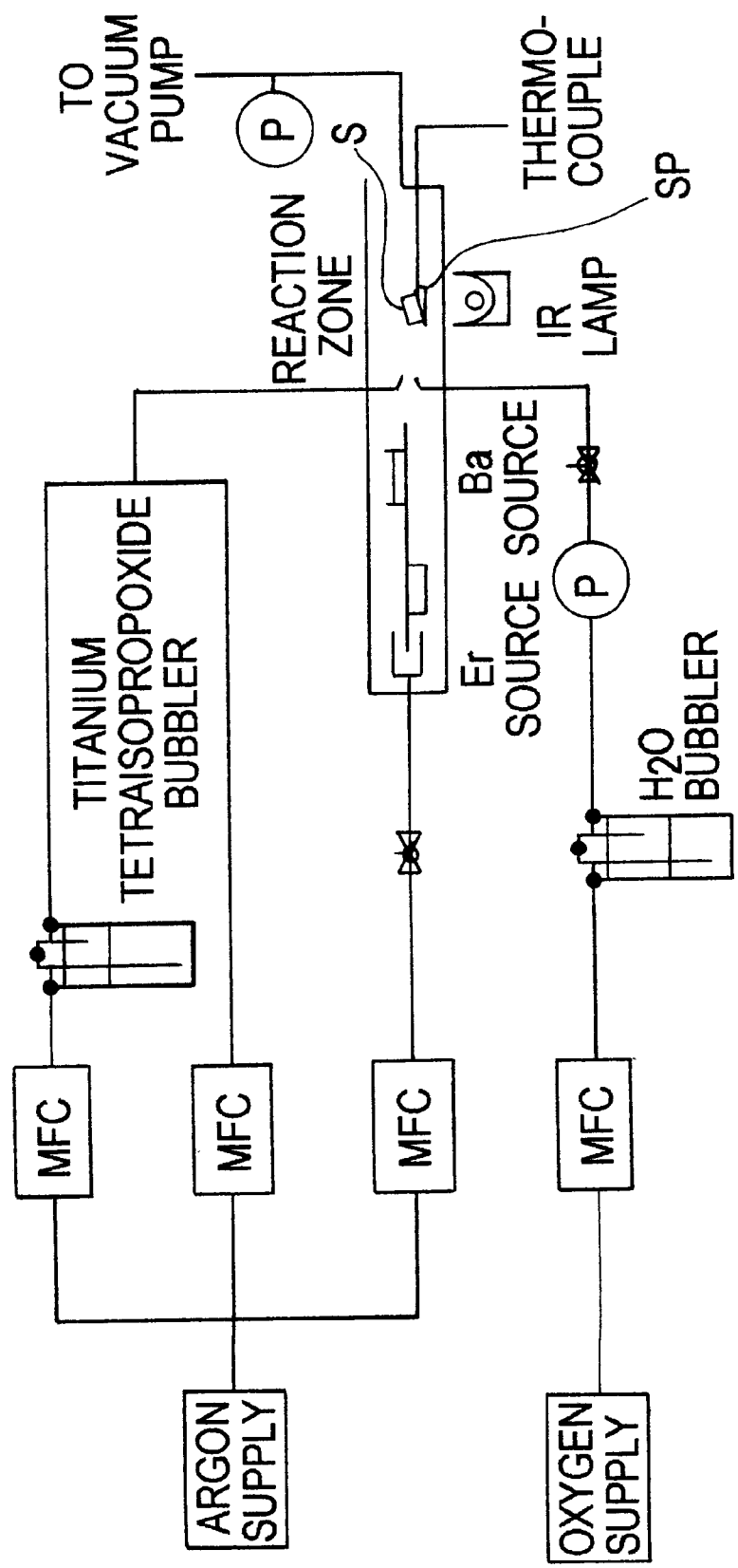
FIG. 9 is a schematic illustration of apparatus for metalorganic chemical vapor deposition of in-situ rare earth doped barium titanate thin film optical medium of the present invention.

Apparatus to this end is shown schematically in FIG. 9 and comprises a low pressure, two-zone horizontal quartz reactor system having a reactor zone that is provided with reactants (metalorganic precursors) in suitable proportions for reaction under the temperature and pressure conditions in the reaction zone to deposit or grow the rare earth doped barium titanate film optical medium on the substrate S.

In the practice of one embodiment of the invention to form an Er doped barium titanate thin film optical medium on a substrate, the metalorganic precursors used included:

Ba(hexafluoracetylacetonate)2(tetraglyme)

titanium tetraisopropoxide [TPT; $Ti(OC_3H_7)_4$], and tris-tetramethylheptanedionate erbium [$Er(thd)_3$].

The Ba and Er solid sources were placed in separate reactor source zones in the manner shown in FIG. 9 and resistively heated. The liquid TPT was stored in a bubbler that was heated by a recirculating bath (not shown). Argon (high purity) was used as a carrier gas to bring the metalorganic precursors into the reactor zone in proper proportions. Oxygen (high purity) bubbled through deionized water was used as the reactant gas for reacting with the metalorganic precursors. The argon and oxygen flow rates were controlled by mass flow controllers (MFC). Pressure gages P were used at appropriate locations of the apparatus. The reactor pressure was set by the total flow rate. An IR (infrared radiation) lamp was used to heat a SiC coated susceptor SP on which the substrate is placed in the reaction zone to provide an appropriate substrate film growth temperature of 800 degrees C. The deposition temperature was monitored by chromel-alumel thermocouple placed inside the susceptor.

The Er doped barium titanate thin films were grown on single crystal $LaAlO_3$ and oxidized Si (100) substrates. However, the invention is not limited to these substrates and other substrates can used. For example, low refractive index substrates can be used, such as MgO, spinel $MgAl_2O_4$ and others for efficient waveguiding for example. The deposition conditions for $LaAlO_3$ and Si (100) substrates are summarized generally in Table I and specifically for Si (100) in Table II.

TABLE I

Growth conditions for the preparation of Er doped $BaTiO_3$ thin films.

| | |
|---|---|
| Growth Temperature (C.) | 800 |
| Substrates | Si(100), $LaAlO_3$(100) |
| Pressure (Torr) | 4 |
| Temperature of $Ba(hfa)_2$(tetraglyme) (C.) | 115–120 |
| Temperate of $Er(thd)_3$ | 100 |
| Temperature of TPT bubbler (C.) | 40–44 |
| Temperature of water bubbler (C.) | 19 |

TABLE I-continued

Growth conditions for the preparation of Er doped $BaTiO_3$ thin films.

| | |
|---|---|
| Total Flow rate (sccm) | 120 |
| Oxygen flow rate (sccm) | 47 |

TABLE II

Growth conditions for the preparation of Er doped $BaTiO_3$ thin films.

| | |
|---|---|
| Growth Temperature (° C.) | 800 |
| Substrate | Si(100) |
| Pressure (Torr) | 4 |
| Temperature of $Ba(hfa)_2$(tetraglyme) (° C.) | 120 |
| Temperature of $Er(thd)_3$ | 100 |
| Temperature of TPT bubbler (° C.) | 41 |
| Temperature of water bubbler (° C.) | 18 |
| Total Flow rate (sccm) | 120 |
| Oxygen flow rate (sccm) | 47 |

The as-deposited films were transparent with color fringes due to thickness variations. The thickness of each film was from about 0.4 to about 1 micron.

Compositional analysis of the deposited Er doped barium titanate films was performed with a Rigaku X-ray powder diffractometer using Ni-filtered Cu K alpha radiation. On Si (100) substrates, the analysis indicated that the film was predominantly oriented polycrystalline. A trace amount of a fluoride impurity phase was also present in the films. Energy dispersive X-ray analysis indicated that the Er was incorporated in the host film at estimated concentrations on the order of several atomic percent; e.g. Er present at $10^{21}$ $cm^{-3}$.

The Er doped barium titanate films deposited on $LaAlO_3$ (100) single crystal substrates were epitaxial with Er incorporated in the $BaTiO_3$ host film in estimated amounts of several atomic percent.

Photoluminescence (PL) measurements were made on Er doped barium titanate thin film optical media deposited on the Si (100) substrates using the unfiltered light (514 nm, 488 nm, etc. where nm is nanometer) from an Ar+ laser with a power output up to 0.1 Watt. The luminescence was dispersed through a Zeiss MM12 monochromator, which was focused onto a liquid nitrogen cooled Ge detector. Standard lock-in techniques were used for the signal analysis.

Figure 1:
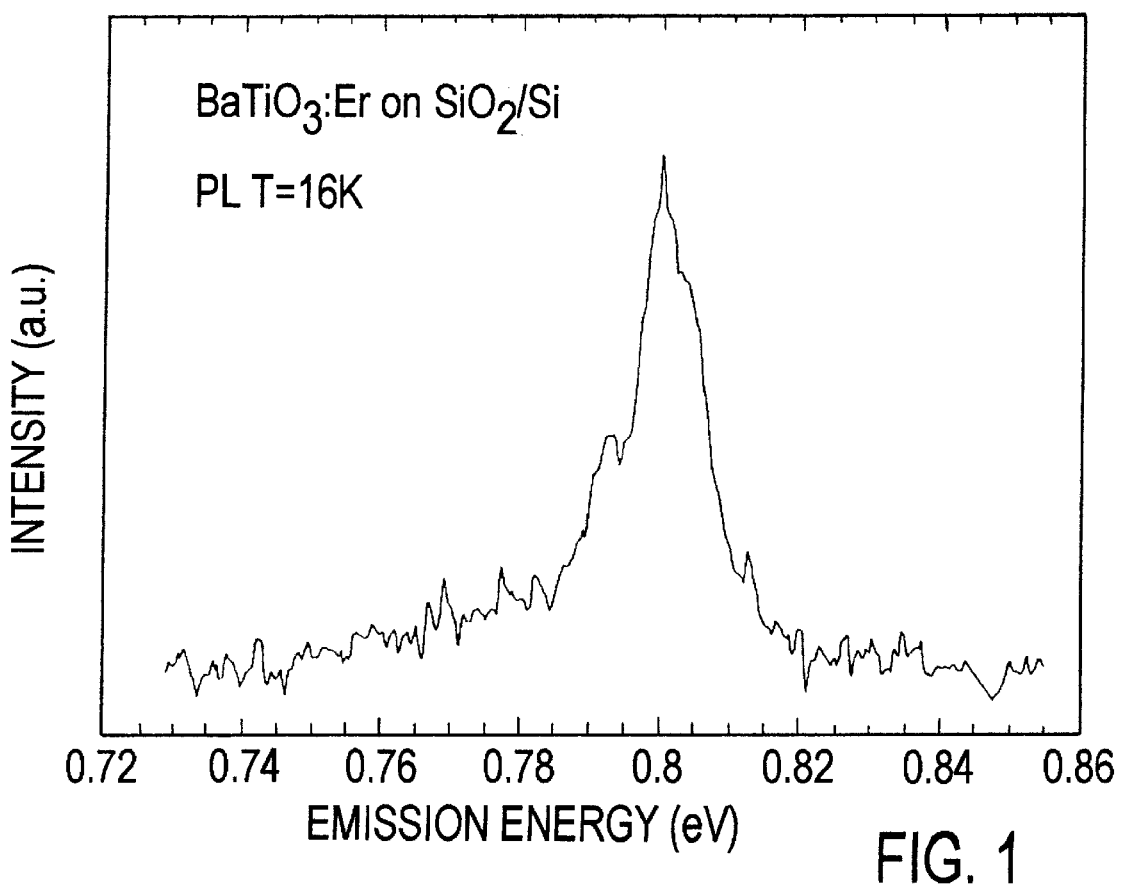
FIG. 1 is a graph illustrating the photoluminescence spectra (emission energy versus intensity) at 16 K of Er doped barium titanate thin film optical medium.

A typical PL spectrum at 16 K of an Er doped barium titanate optical medium is shown in FIG. 1. A peak centered at 0.800 eV was observed that corresponds to the intra-4f transitions between the first excited ($I_{13/2}$) and ground state ($I_{15/2}$) state of Er+ ion. An additional Er-related peak at 0.793 eV (electron volt) is also observed. Other unresolved shoulders appear on the higher energy side of the main peak. The full width half maximum (FWHM) of the main peak was 5 mev (millielectron volt) on the order of the instrumental resolution determined by the slit width. The complex structure of the emission peak of the Er center may be attributed to the Stark splitting of the degenerate 4f levels or homogenous and inhomogenous broadening, although Applicants do not wish to be bound by any theory.

Figure 2:
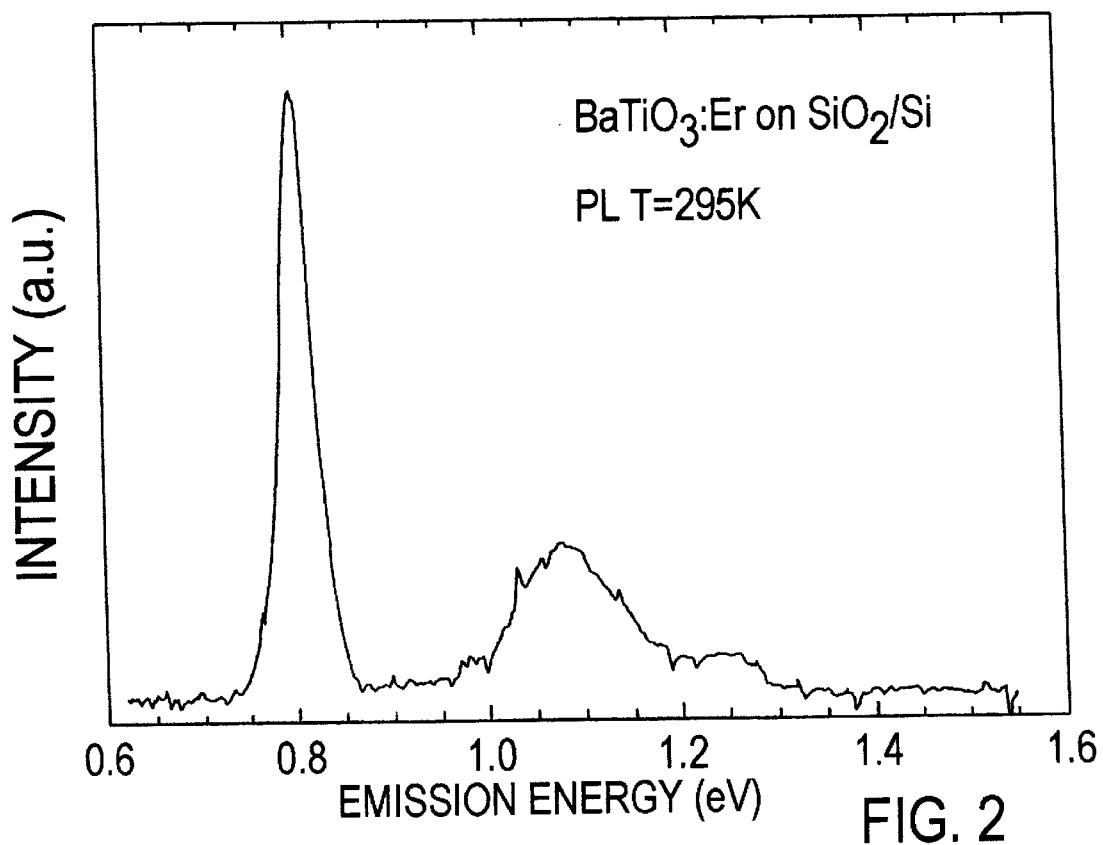
FIG. 2 is a graph illustrating the photoluminescence spectra at 295 K of Er doped barium titanate thin film optical medium.

The PL spectrum of a typical Er doped barium titanate film optical medium at room temperature is shown in FIG. 2. The intensity of the room temperature emission was approximately less than an order of magnitude lower than that of the lower temperature emission discussed above. The FWHM of the peak was resolution limited (resolution =30 meV) by the instrument. The peak was centered at 0.802 eV, a shift of only 2 meV from the lower temperature peak, this shift being within the experimental error of the instrument. The broad peak near 1.1 eV was attributed to the Si substrate.

Figure 3:
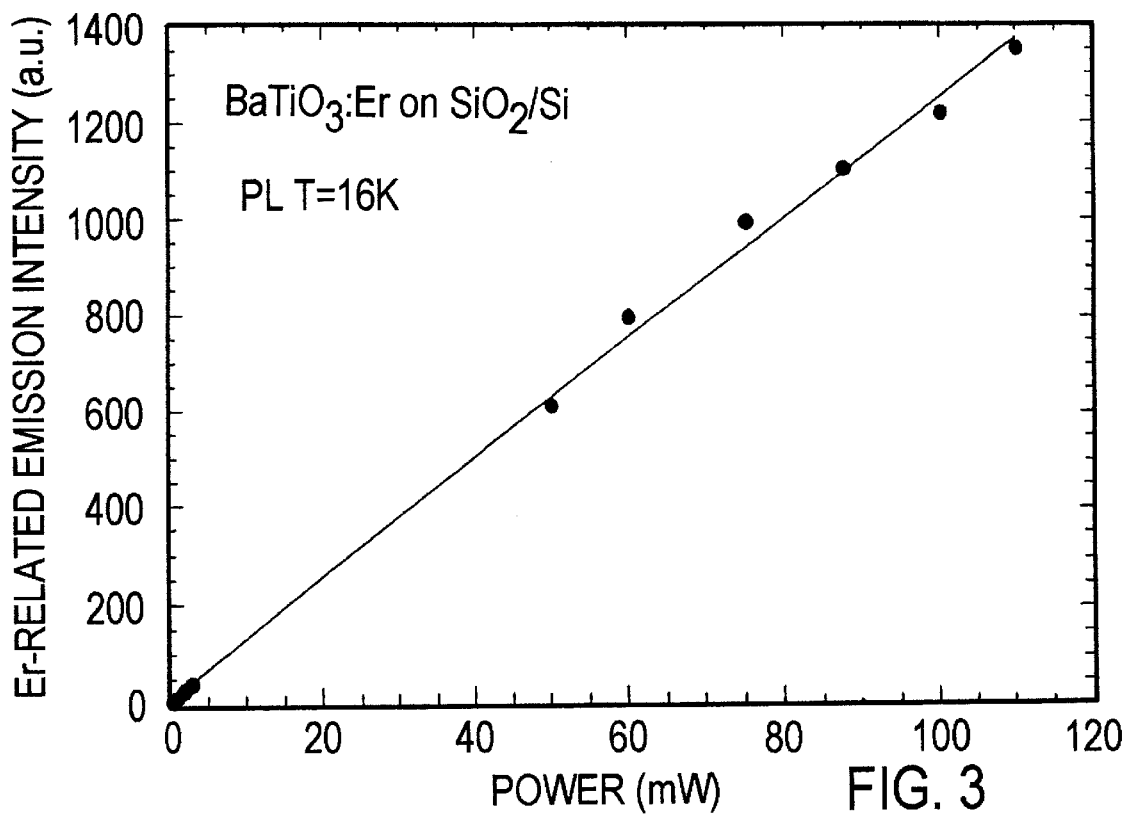
FIG. 3 is a graph illustrating the dependence of Er-related emission intensity versus optical pumping power.

The dependence of the PL emission intensity on the excitation power is shown in FIG. 3. The intensity was linearly dependent up to 100 mW (milliWatt), which corresponds to a power density of 10 W/cm$^2$ (Watts per centimeter squared), the maximum incident power. The linear nature of intensity indicates that saturation of the Er related emission centers was not important at these power levels.

Figure 4:
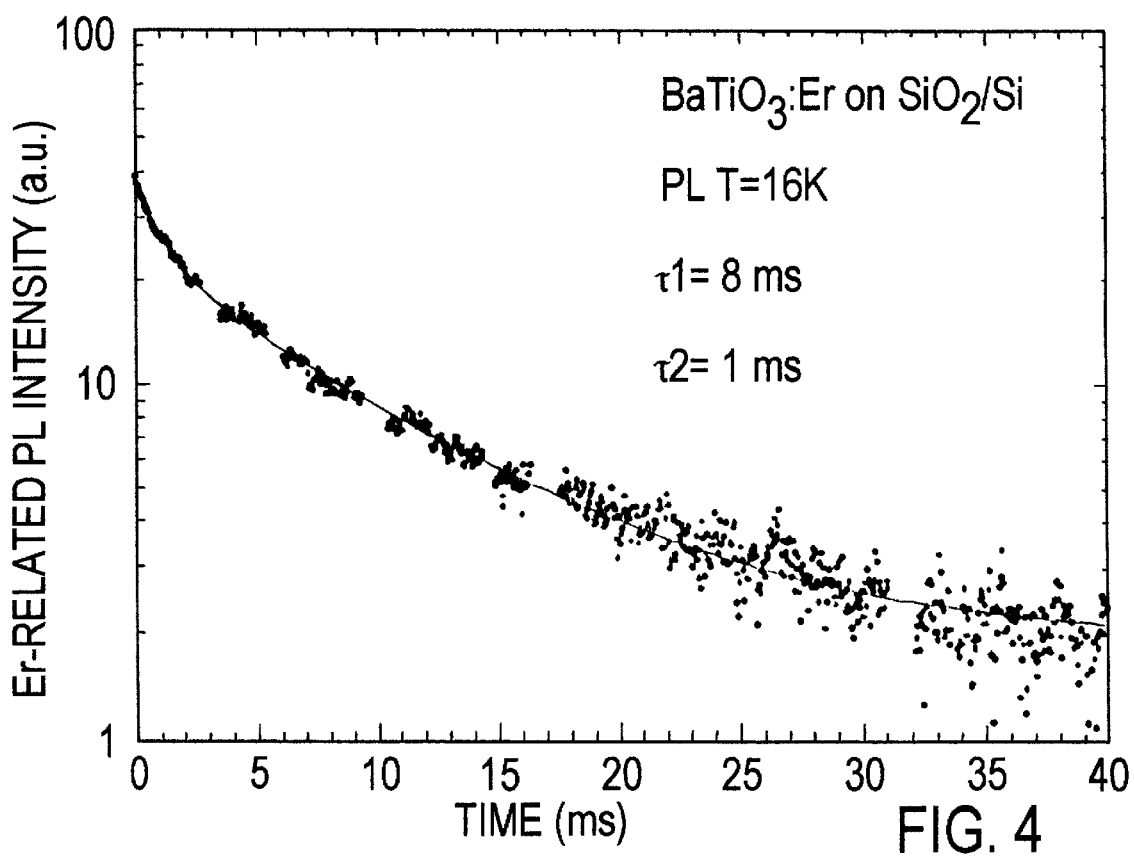
FIG. 4 is a graph of the photoluminescence decay at 16 K of 0.8 eV emission of Er in barium titanate thin film optical medium.

FIG. 4 shows the results of time resolved measurements made on the 0.80 eV emission band. The decay of the PL intensity with time is apparent. The decay was found to be composed of two separate exponential decay liftimes; e.g. 1 and 8 ms (milliseconds).

It is apparent that optically active Er+ centers are incorporated into the barium titanate thin film optical medium by the metalorganic chemical vapor deposition process described hereabove. Strong characteristic 4f emission from Er+ at 0.80 eV was observed at room temperature. Two independent lifetimes of 1 and 8 ms were measured, suggesting that the Er forms two distinct types of radiative centers, although Applicants do not wish to be bound by this theory.

Figure 5:
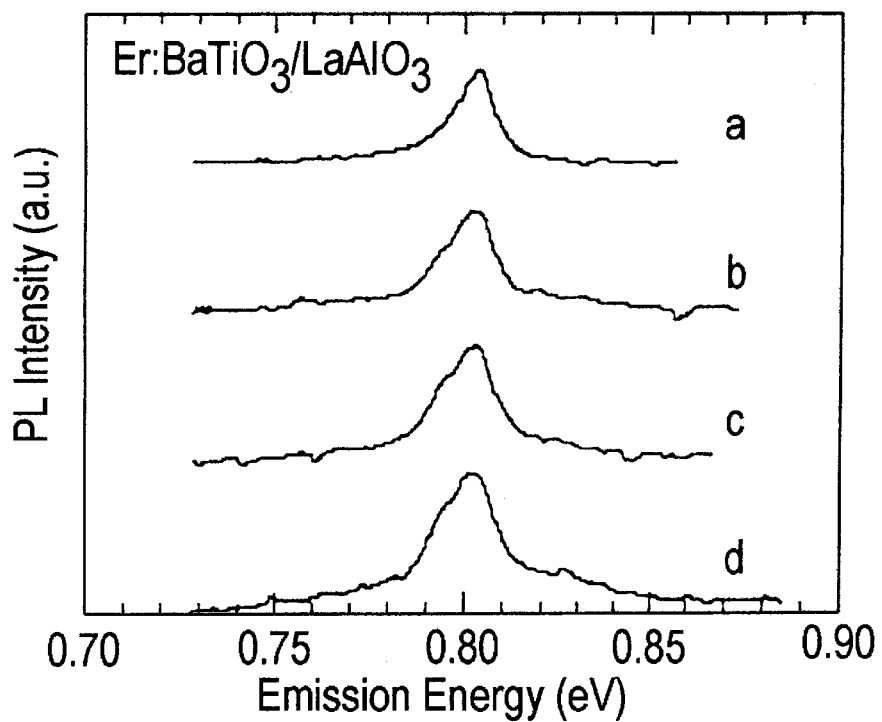
FIG. 5 is is a graph of photoluminescence spectra of Er doped barium titanate at four different temperatures.

Results similar to those described hereabove on Si(100) substrates were observed for Er doped barium titanate thin film optical medium deposited on single crystal LaAlO$_3$ (100) substrates in the manner described hereabove. FIG. 5 illustrates the photoluminescence spectra of erbium doped barium titanate thin films at four temperatures. The peak emission energy remains the same over the temperature range studied. The integrated intensity peak was essentially the same at 18K and 295K.

Figure 6:
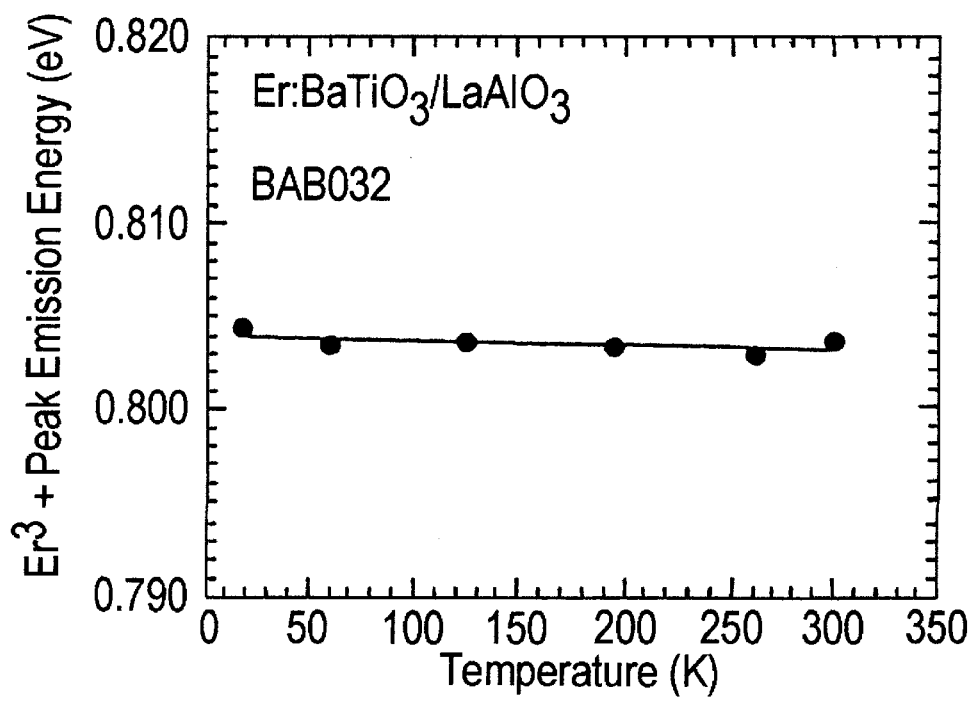
FIG. 6 is a graph of peak emission energy as a function of temperature.

The Er$^{+3}$ peak emission is plotted as a function of temperature in FIG. 6. The peak shifts only one meV as the temperature increases from 20K to 300K. This corresponds to a temperature coefficent of $-3 \times 10^{-6}$ eV/K.

Figure 7:
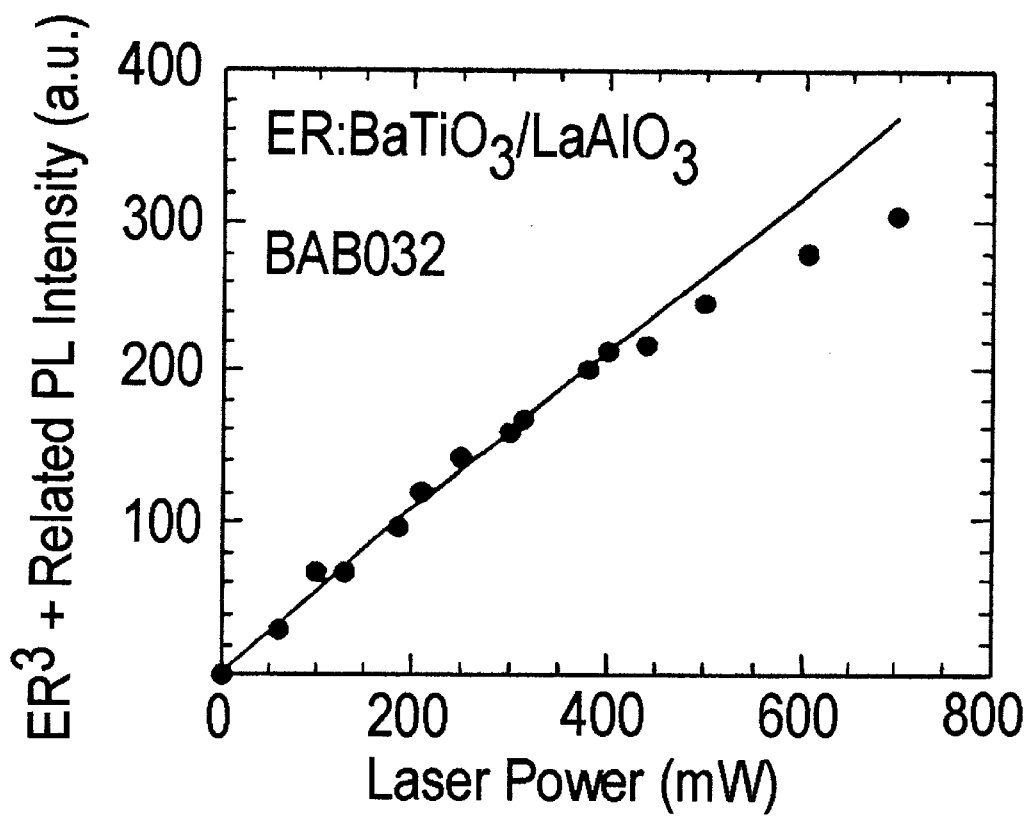
FIG. 7 is a graph of photoluminescence intensity versus pump laser power.

The dependence of photoluminescence intensity on pump laser power is plotted in FIG. 7. For pump powers up to 400 mW, the PL intensity depends linearly on pump power. A pump power of 400 mW corresponds to a power density of 100 W/cm$^2$. Above this power, a sublinear dependence is observed.

Photoluminescence decay times for erbium doped barium titanate measured at 18K and 300K exhibit two decay components; a fast component with a lifetime of 1 ms and a slow component with a lifetime of 6 ms. The slower decay time is similar to what is observed for the Er transition in other host materials. For example, the radiative lifetime of I$_{13/2}$ transition ranges between 15 and 4 ms in silicates and tungstates, respectively. Since the measured lifetime is comparable to the predicted radiative lifetime, it appears that the non-radiative transitions are minimal in the erbium doped barium titanate thin film optical medium. although Applicants do not wish to be bound by any theory.

A sample calculation of laser gain can be made assuming minimal scattering losses and negligible concentration quenching in the thin film optical media of the invention. The gain is given by the equation: G=σNL where σ is the absorption cross-section, N is the number of optically active Er atoms, and L is the optical cavity length. To calculate gain, σ is taken as $1 \times 10^{-20}$ for Er$^3$+and N is taken as $10^{21}$/cm$^3$. The gain is calculated to be 10/cm. Provided waveguide losses are minimized, miniature solid state lasers in erbium doped barium titanate with dimensions of the order of 1 mm can be realized.

To summarize, the Er doped barium titanate thin film optical medium emits under optical excitation the characteristic intra–4f electron shell luminescence from the Er$^{3+}$ ion at 1.54 microns over a temperature range of 10 to 295 K. The emission is only weakly temperature dependent. Thus, the Er doped barium titanate thin film optical medium is well suited for integrated optics as an optically active, non-linear waveguide medium, optical gain or amplifier medium, electro-optic modulator medium, and other optical working medium in optical devices where the medium transmits, guides, amplifies, modulates, splits, and/or otherwise acts on or with the light. For example, optically active planar waveguides can be fabricated from Er doped barium titanate. Moreover, self-modulated lasers and self-frequency doubled lasers can be fabricated from Er doped barium titanate film that combine the optical emission from the rare earth dopant and the outstanding electro-optic and non- linear optical properties of the barium titanate host film optical medium.

Although the present invention has been described hereabove with respect to Er doped barium titanate thin film optical medium, it is not so limited and can be practiced using other rare earth dopants including but not limited to Tm, Pr, Tb, Dy, Sm, Ho, Ce, Eu, Gd, and Lu alone or in combination. Tm doped barium titanate thin film may find use as an up conversion light emitter, while Pr doped barium titanate thin film may find use as an infrared emitter.

Figure 8:
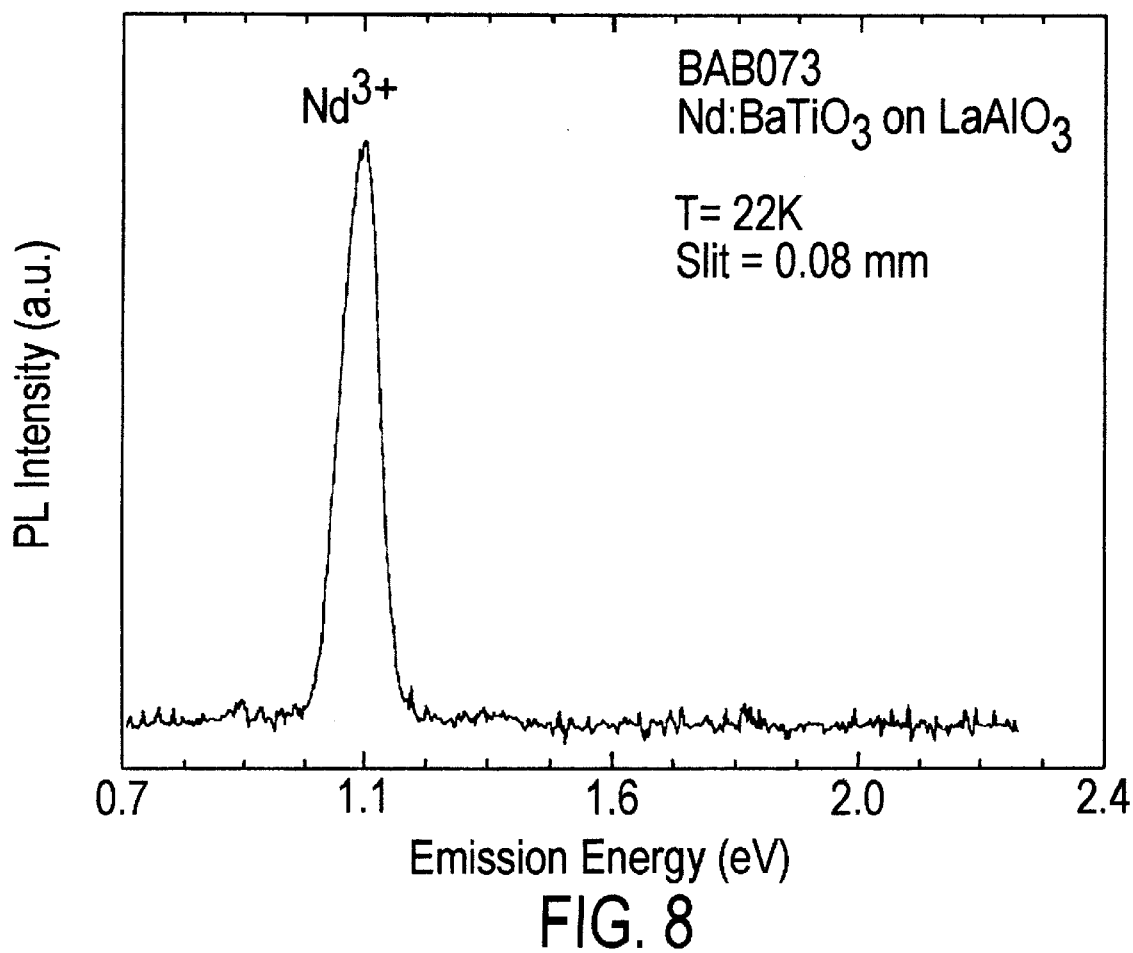
FIG. 8 is a graph illustrating the photoluminescence spectra at 22K of Nd doped barium titanate thin film optical medium.

For purposes of illustration and not limitation, a Nd doped barium titanate thin film optical medium was made using the metalorganic chemical vapor deposition process described hereabove on a single crystal LaAlO$_3$ (100) substrate under metalorganic conditions similar to those described hereabove in Table I. The thin Nd doped barium titanate films had a thickness in the range of about 0.2 to about 0.7 microns. The films included about one atomic percent Nd as measured by energy dispersive X-ray analysis. FIG. 8 illustrates a typical PL spectrum at 22K of an Nd doped barium titanate optical medium. An Nd-related peak is observed centered at about 1.1 eV.

The present invention provides for the manufacture of rare earth doped barium titanate thin film optical media by metalorganic chemical vapor deposition directly on a variety of substrates that will allow waveguiding to incorporate rare earth dopant in-situ during film deposition. That is, the metalorganic chemical vapor deposition permits the rare earth dopant to be incorporated in the barium titanate host film optical medium in-situ as the the film is deposited on the substrate, preferably as an epitaxial film grown on a single crystal substrate for use as an optical working medium.

Further, since barium titanate exhibits a higher electro-optic coefficent than lithium niobate, rare earth doped barium titanate thin film optical media should require less operating voltage than those media comprising lithium niobate. In addition, since the optical gain in an optical medium is proportional to the concentration of optically active ions, higher optical gain should be possible in rare earth doped barium titanate thin film optical medium as a result of the higher solubility of Er$^3$+in barium titanate than in lithium niobate.

Although certain specific embodiments and features of the invention have been described hereabove, it is to be understood that modifications and changes may be made therein without departing from the spirit and scope of the invention as defined in the appended claims.

What is claimed is:

1. Thin film optically active working medium for use in an optical device, said optically active working medium comprising an epitaxial ferroelectric oxide thin film on a substrate and having at least about 0.01 atomic percent rare earth element therein effective under excitation to exhibit 4f electron shell peak emission energy that is characteristic of said rare element and substantially temperature independent from 10K to 295K.

2. The medium of claim 1 wherein said thin film comprises including rare earth including barium titanate thin film that is metalorganic chemical vapor deposited on a substrate.

3. The medium of claim 2 wherein said rare earth including barium titanate thin film includes Er dopant therein.

4. The medium of claim 2 wherein said rare earth including barium titanate thin film includes Nd dopant therein.

5. The medium of claim 1 wherein said thin film is from about 0.1 to about 5 microns in thickness.

6. Thin film optically active working medium for use in an optical device, said optically active working medium comprising an epitaxial barium titanate thin film on a substrate and having at least about 0.01 atomic percent rare earth element therein effective under excitation to exhibit 4f electron shell peak emission energy that is characteristic of said rare element and substantially temperature independent from 10 K to 295 K.

* * * * *

UNITED STATES PATENT AND TRADEMARK OFFICE
CERTIFICATE OF CORRECTION

PATENT NO.   : 6,122,429
DATED        : September 19, 2000
INVENTOR(S)  : Bruce W. Wessels et al.

It is certified that error appears in the above-identified patent and that said Letters Patent is hereby corrected as shown below:

Column 7,
Line 4, after "rare" insert -- earth --

Column 8,
Line 9, after "rare" insert -- earth --.

Signed and Sealed this

Fifth Day of March, 2002

Attest:

JAMES E. ROGAN
Attesting Officer
Director of the United States Patent and Trademark Office